United States Patent [19]

Harland et al.

[11] Patent Number: 4,517,144

[45] Date of Patent: May 14, 1985

[54] METHOD FOR CUTTING AND SEPARATING GREEN CERAMIC CAPACITOR BODIES

[75] Inventors: Gary D. Harland; Dean B. Brownell, both of Wichita Falls, Tex.

[73] Assignee: Sprague Electric Company, North Adams, Mass.

[21] Appl. No.: 553,613

[22] Filed: Nov. 21, 1983

[51] Int. Cl.³ ............................................. B28B 11/00
[52] U.S. Cl. ...................................... 264/28; 264/67; 264/157
[58] Field of Search ...................... 264/28, 86, 61, 175, 264/60, 67

[56] References Cited

U.S. PATENT DOCUMENTS

| | | | |
|---|---|---|---|
| 3,097,929 | 7/1963 | Ragan | 264/67 |
| 3,275,721 | 9/1966 | Leroy | 264/60 |
| 3,461,196 | 8/1969 | Bowles | 264/67 |
| 3,538,571 | 11/1970 | Callahan | 264/67 |
| 4,428,895 | 1/1984 | Blasch | 264/60 |

*Primary Examiner*—Donald Czaja
*Assistant Examiner*—V. Fischbach

[57] ABSTRACT

A group of monolithic ceramic capacitors are made by repeatedly passing a substrate under a falling curtain of a ceramic slurry, drying each layer and screen printing an electroding ink pattern on successive of the dried ceramic layers to provide a green cake containing buried electrode patterns. The cake is diced using a razor blade. It is then removed from the supporting substrate and flooded with liquid nitrogen. The chilled cake is then mechanically stressed to provide near perfectly separated green bodies along the cutting planes.

10 Claims, No Drawings

METHOD FOR CUTTING AND SEPARATING GREEN CERAMIC CAPACITOR BODIES

BACKGROUND OF THE INVENTION

This invention relates to methods for making ceramic capacitors, and more particularly to such methods that include the fabrication of a large sheet or cake of green ceramic from which many capacitor bodies are separated.

The small capacitor bodies to which the present invention especially pertains have a largest dimension ranging from a quarter of an inch (6mm) down to less than 0.040 inch (1 mm). Such small sizes require more precision in cutting and mitigate against the use of cutting means that remove material and leave a kerf, such as by wire saw or laser. Thus shearing and dicing are the indicated cutting means. However, shearing has the disadvantage that an intolerable amount of distortion and disfiguration is produced at the periphery of small separated green ceramic parts.

Dicing as with a razor blade has become the preferred means of cutting the smaller green ceramic bodies because dicing ideally removes no material and causes a minimum amount of distortion to the cut parts.

Wafer capacitors of rectangular shape, may be cut apart from a large sheet of green ceramic, whereby electroding ink films are deposited on opposite surfaces of each wafer body in the sheet prior to cutting and both the body and the electroding ink are fired after cutting. Alternatively the electroding steps may occur after cutting and firing of the bodies.

Monolithic ceramic capacitors having buried electrodes are made by applying patterns of an electroding ink onto a plurality of green ceramic layers, stacking the inked ceramic layers, cutting and separating the individual capacitor bodies and cofiring the buried electroding ink films and the ceramic bodies. In this instance, it is crucial to align the positions of cutting with the electroding-ink pattern so that the finished product will have alternate pairs of buried electrodes extending from different side surfaces of the body. Cutting precision is therefore especially necessary for making such capacitors that are electroded before cutting.

Furthermore the layers of green ceramic for making monolithic capacitors are generally very thin, in the order of 1 to 3 mils ( 0.025 to 0.075 mm) and are non self supporting. Such layers may be formed by spraying, casting, extruding or curtain coating onto a carrier. The later method always requires use of a porous substrate such as cardboard, as is further elaborated by Hurley et al in U.S. Pat. No. 3,717,487 issued February 20, 1973 and assigned to the same assignee as is the present invention and this patent is incorporated by reference herein. A porous substrate breathes providing a passage-way by which organic volatile gases escape from the ink (and the ceramic slurry of which the green ceramic layers are formed).

The ceramic adheres especially well to such porous substrates having the advantage that registration is reliably maintained between the cutting blade and the electrode pattern. A disadvantage is also evident, namely that there is nowhere for the ceramic stack adjacent the blade of finite thickness to go, except to crowd and at least temporarily compress.

The green ceramic material of the stack is in powder form typically bound together and to the porous carrier by a mixture of an organic binder and an organic plasticizer. The stack is thus somewhat resilient so that the disconfiguration occuring at the moment of cutting essentially disappears when the blade is withdrawn. But this resilient material is also sticky and sticks to itself more securely than to the carrier. It can therefore be removed from the carrier by applying a lateral force to the stack relative to the carrier.

However, many of the individual bodies that had been separated by the blade now stick together again. When such a pair of stuck-together bodies are broken apart, the surface at which it breaks generally deviates at least in one region from the plane of the cutting blade. Thus such stuck-together parts must as a practical matter be relegated to the scrap pile. This represents decreased yields near the end of the manufacturing process at which most of the value had been added to the product.

It is therefore an object of the present invention to provide an efficient means for cutting and separating from a green ceramic piece a plurality of small ceramic capacitor bodies.

SUMMARY OF THE INVENTION

A method for cutting and separating green ceramic capacitor bodies from a green ceramic cake comprises cutting the cake by pressing a sharp blade into the cake, withdrawing the blade, chilling the cake to less than $-100°$ C. and mechanically stressing the cake to break apart the cake cleanly at the plane of said cutting.

The cutting may be repeated using the same blade to make a series of parallel cuts and rotating the cake 90 degrees and making another parallel group of cuts in the cake. This diced cake can then be chilled and shaked in a container to effect the mechanical stressing. The chilling is preferably accomplished by submersing the cut cake into liquid nitrogen or another inert chilling liquid.

This method is capable of providing a very great improvement over prior art methods of the past decade or more, in terms of efficiency and accuracy of separating the green bodies. Manufacturing losses at this point are substantially reduced to zero.

DESCRIPTION OF THE PREFERRED EMBODIMENTS

A ceramic slurry was prepared by dispersing a green dielectric ceramic powder in a mixture of xylene, a butylmethacrylate binder and amyl acetate, as is described in more detail by Hurley et al. The ceramic powder is one of the barium titanate powders mixed with a glass that is described by Maher as A-3 in U.S. Pat. No. 3,885,941 issued May 27, 1975 and assigned to the same assignee as is the present invention. The powder is pulverized so that the powder particle sizes are less than 2 microns.

A flat substrate having a porous paper cover layer is passed through a continuously falling sheet of the ceramic slurry. The slurry has a viscosity of about 1000 centipoise. The substrate is re-passed through the falling sheet until a build-up of 1 to 2 mils (25 to 50 microns) is obtained. The build-up is then dried to remove the xylene, and amyl acetate solvents.

An electroding ink, comprising a fine powder of a silver/palladium alloy and an organic vehicle is selectively screen printed in a matrix pattern of ink film patches onto the surface of the green ceramic build-up. The substrate is then passed again through the falling ceramic-slurry sheet, dried and screen printed with another pattern of ink patches registered with the underlying first one. This sequence is repeated until the stack contains a desired number N of "active dielectric layers" and N+1 electrode patterns. Then a few more passes under the falling sheet are made without more electroding ink to complete the stack.

During the application of each succeeding ceramic layer the stack is maintained at a temperature of between about 55°–80° C. to facilitate removal from each layer applied of the solvents in the ceramic as well as those in the ink.

The final stack and substrate are mounted on a horizontal table that is movable in a horizontal direction. A single, long, sharp razor blade is pushed down into the green ceramic stack, sometimes referred to as the cake. The blade is withdrawn; the table is moved a predetermined distance in said direction that is perpendicular to the vertical plane of the blade; and the blade is lowered to cut through the ceramic cake again and withdrawn. The table is again moved the predetermined distance in the same direction and the process is repeated until the blade is near the edge of the cake.

The substrate and cake are rotated ninety degrees on the table and the above-noted sequential cutting process is run again except the table is moved each time another predetermined distance, because it is usually desired that each body have a different width than length.

The substrate is then demounted from the cutting table, and the diced green ceramic cake is removed from the substrate by flexing the cardboard and/or by pushing the cake relative to the substrate in a direction in the plane of the interface there between. The blade penetrates substantially through the cake.

Some of the bodies, usually more than 80%, are completely free and independant from their neighbors. The rest are stuck or agglomerated in groups of 2 to about 10 bodies.

The pushing procedure, noted above, for separating the cake from the substrate actually exacerbates sticking of adjacent bodies but otherwise represents the least damaging method for removing the bodies from the substrate.

The entire group of bodies taken from the substrate were then poured into a beaker containing liquid nitrogen. After 90 seconds, the liquid nitrogen was drained away and the beaker containing the "frozen" green ceramic bodies was gently shaken to break apart the stuck-together bodies.

Strong shaking action tends to break some of the bodies themselves. It was experimentally concluded that a gentle rocking that causes the bodies to periodically roll enmasse over each other is always effective in breaking all stuck-together bodies apart while doing no damage to the bodies themselves. Such a shaking rolling action can easily be accomplished by holding the beaker pendently in a gloved hand and rocking it by pivoting at about the wrist at a rate of about two cycles per second over an arc of about 45 degrees. A similar but more controlled and repeatable action was achieved by mounting a beaker clamp to a horizontally mounted shaft that oscillates to acheive the above-noted rocking motion of the beaker. Five seconds of shaking is often enough to break apart all the bodies but in extreme cases shaking for as long as 30 seconds was necessary.

Inspection of the bodies, after shaking, using a microscope at 20X magnification surprisingly reveals that the body edges are much more planar and smooth than are other bodies not having been chilled but having been broken by shaking or by any other purely mechanical means.

The temperature of liquid nitrogen is lower (colder) than −196° C. At this low temperature the ceramic bodies are chilled rapidly to a low enough temperature for effective breaking-apart by a subsequent mechanical shaking. Other means of chilling to a rigid non plastic state, to at least −100° C., would also be effective.

Other deviations from the above preferred method are considered to be within the scope of this invention. The steps of curtain coating layers of green ceramic may be replaced by spraying, or by stacking up preinked layers of extruded or cast green tapes. And of course ceramic wafer capacitors having only two electrodes on opposite body faces may be made using this method.

What is claimed is:

1. A method for cutting and separating green ceramic capacitor bodies containing buried electrodes comprising forming a green ceramic cake containing said buried electrodes on a porous substrate; cutting said cake by pressing a long sharp blade into and substantially through said cake to establish a cutting plane there through and with drawing said blade; chilling said cake to a temperature colder than −100° C.; and mechanically stressing said cake to break said green cake cleanly at said plane of said cutting.

2. The method of claim 1 wherein said chilling is accomplished by submersing said cut cake in liquid nitrogen.

3. The method of claim 1 wherein said mechanically stressing is accomplished by placing said chilled cake in a container and gently shaking said container.

4. The method of claim 1 additionally comprising after said cutting and prior to said chilling, repeatedly displacing said cake by a predetermined distance in a perpendicular direction to the plane of said blade and again cutting said cake to form a series of parallel cuts in said cake.

5. The method of claim 4 additionally comprising, after said repeately displacing and cutting, rotating said cake 90 degrees and repeatedly displacing said cake by a predetermined amount in a perpendicular direction to the plane of said blade and cutting said cake to form a group of parallel cuts in said cake that are perpendicular to said series of parallel cuts.

6. The method of claim 5 wherein said mechanically stressing is accomplished by placing said chilled cake in a container and rocking said container to cause the separated of said bodies to periodically flow enmasse over each other and effect complete separation of all bodies.

7. The method of claim 5 wherein said forming is accomplished by making a ceramic slurry comprising precursor ceramic powders dispersed in an organic vehicle, producing a falling sheet of said slurry, repeatedly passing a substrate through said falling sheet to form a stack of layers of said slurry, drying each of a group of said layers and depositing an electroding ink pattern on each of said dried layers.

8. The method of claim 7 additionally comprising firing said separated green ceramic bodies to maturity to form monolithic ceramic capacitors containing buried electrodes.

9. A method for cutting and separating a green ceramic cake into plurality of green ceramic capacitor bodies comprising:

a. pressing into said cake and substantially through said cake a blade that is long enough to cut said cake into two pieces;

b. withdrawing said blade;

c. moving said cake a predetermined distance relative to said blade at right angles to the plane of said blade;

d. repeating steps a, b and c to make many parallel cuts in said cake;

e. rotating said cake 90 degrees relative to said blade and repeating steps a, b and c to define by said cuts a plurality of rectangular bodies in said cake;

f. submersing said bodies in liquid nitrogen; and g. shaking said chilled green bodies to separate those that were stuck together.

10. The method of claim 9 additionally comprising, prior to said pressing said blade into said cake, forming said cake on a porous substrate; and prior to submersing said bodies in said liquid nitrogen, applying a lateral force to said bodies relative to said substrate to remove said bodies therefrom.

* * * * *